US012698689B2

(12) United States Patent
Rokne et al.

(10) Patent No.: US 12,698,689 B2
(45) Date of Patent: Aug. 4, 2026

(54) SUBSEA ACTUATION SYSTEM WITH RETRIEVABLE POSITION INDICATOR

(71) Applicant: TechnipFMC Norge AS, Kongsberg (NO)

(72) Inventors: Øyvind Rokne, Kongsberg (NO); Deviprasad M S Bhat, Kongsberg (NO)

(73) Assignee: TechnipFMC Norge AS, Kongsberg (NO)

( * ) Notice: Subject to any disclaimer, the term of this patent is extended or adjusted under 35 U.S.C. 154(b) by 0 days.

(21) Appl. No.: 18/998,373

(22) PCT Filed: Jul. 25, 2023

(86) PCT No.: PCT/EP2023/070523
§ 371 (c)(1),
(2) Date: Jan. 24, 2025

(87) PCT Pub. No.: WO2024/023058
PCT Pub. Date: Feb. 1, 2024

(65) Prior Publication Data
US 2025/0369302 A1      Dec. 4, 2025

(30) Foreign Application Priority Data

Jul. 26, 2022    (NO) .................................... 20220830

(51) Int. Cl.
*E21B 33/035*        (2006.01)
*E21B 34/16*         (2006.01)
(Continued)

(52) U.S. Cl.
CPC ............ *E21B 33/035* (2013.01); *E21B 34/16* (2013.01); *E21B 41/04* (2013.01); *F16K 37/0008* (2013.01)

(58) Field of Classification Search
CPC .... E21B 33/035; E21B 33/0355; E21B 34/16; E21B 41/04; F16K 37/0008;
(Continued)

(56) References Cited

U.S. PATENT DOCUMENTS 1,919,233  A  *  7/1933  Lee ..................... F16K 37/0008
                                                        251/359
2,061,852  A  *  11/1936  Schweitzer ............... F16K 1/54
                                                        73/861.58
(Continued)

FOREIGN PATENT DOCUMENTS

CN        109424778  A  *  3/2019  ........... F16K 31/047
EP          0962622  A2    12/1999
(Continued)

OTHER PUBLICATIONS

International Search Report and Written Opinion for Application No. PCT/EP2023/070523, dated Sep. 22, 2023.
(Continued)

*Primary Examiner* — David Colon-Morales
(74) *Attorney, Agent, or Firm* — Kevin E. West; Advent, LLP

(57) ABSTRACT

A subsea actuation system with a, at least partly, retrievable position indicator is disclosed. The subsea actuation system being connectable to a subsea structure with a valve with a rising valve stem, the rising valve stem comprising a rotation-to-linear mechanism for operating the valve, the subsea actuation system comprising an interface for receiving rotational input from a separate retrievable actuator. The interface comprises a cylindrical bucket comprising an opening in an axial direction of the cylindrical bucket, and a shaft for receiving the rotational input from the retrievable actuator, the shaft being connected to the rotation-to-linear mechanism. The position indicator is configured for indicating an amount of rotational movement of the shaft and hence a
(Continued)

position of the valve, and at least a part of the position indicator is configured to be positionable at, and retrievable from, the interface.

20 Claims, 2 Drawing Sheets

(51) Int. Cl.
    *E21B 41/04*         (2006.01)
    *F16K 37/00*         (2006.01)
(58) Field of Classification Search
    CPC ............. F16K 37/0016; F16K 37/0058; F16K 37/0041; F16K 31/047
    See application file for complete search history.

(56) References Cited

U.S. PATENT DOCUMENTS

| | | | | |
|---|---|---|---|---|
| 2,932,979 | A * | 4/1960 | Raleigh ............... | F16K 37/0008 74/504 |
| 5,538,037 | A * | 7/1996 | Piz ao ................. | F16K 37/0041 137/554 |
| 8,596,608 | B2 * | 12/2013 | Grimseth ................ | E21B 34/04 251/74 |
| 9,103,459 | B2 * | 8/2015 | Borchgrevink ..... | F16K 37/0008 |
| 9,188,499 | B2 * | 11/2015 | Hayward ................ | E21B 47/06 |
| 9,920,842 | B1 * | 3/2018 | Karani ................ | F16K 37/0016 |
| 10,233,722 | B2 * | 3/2019 | Tang ................... | E21B 33/0355 |
| 10,370,924 | B2 * | 8/2019 | Roberts-Haritonov ...................... | E21B 33/0355 |
| 10,460,846 | B2 * | 10/2019 | Ko ...................... | F16K 37/0016 |
| 10,669,801 | B2 * | 6/2020 | Roberts-Haritonov ..................... | E21B 34/04 |
| 10,731,775 | B2 * | 8/2020 | Theiss ...................... | F16D 7/00 |
| 10,774,620 | B2 * | 9/2020 | Johnson .................. | E21B 41/04 |
| 10,808,485 | B2 * | 10/2020 | Phielipeit-Spiess ........................ | E21B 33/0385 |
| 10,900,317 | B2 * | 1/2021 | Daley ..................... | E21B 41/04 |
| 11,073,227 | B2 * | 7/2021 | Bushman ............ | F16K 37/0008 |
| 11,156,055 | B2 * | 10/2021 | Rao ........................ | E21B 33/063 |
| 11,156,307 | B2 * | 10/2021 | Harris ................... | F16K 31/047 |
| 11,204,104 | B2 * | 12/2021 | Krause ................... | C10B 25/10 |
| 11,255,462 | B2 * | 2/2022 | Bushman ............ | F16K 37/0008 |
| 11,326,742 | B2 * | 5/2022 | Yanagida ................ | F17C 13/04 |
| 11,384,617 | B2 * | 7/2022 | Landa .................. | F16K 31/007 |
| 2005/0173667 | A1 | 8/2005 | Zheng | |
| 2012/0234410 | A1 | 9/2012 | Borchgrevink et al. | |
| 2017/0175927 | A1 | 6/2017 | Kotrla et al. | |
| 2017/0191338 | A1 | 7/2017 | Whitby | |
| 2018/0156351 | A1 | 6/2018 | Eastoe et al. | |
| 2019/0153802 | A1 | 5/2019 | Rao | |
| 2019/0323318 | A1 | 10/2019 | Valera et al. | |

FOREIGN PATENT DOCUMENTS

| | | |
|---|---|---|
| EP | 2604788 A2 | 6/2013 |
| EP | 3492788 B1 | 11/2020 |

OTHER PUBLICATIONS

European Examination Report for Patent Application 23748247.6, dated Jan. 19, 2026.

Norwegian Office Action for Patent Application No. 20220830, dated Feb. 24, 2023.

Norwegian Office Action in Patent Application No. 20220830 dated Mar. 5, 2026.

* cited by examiner

SUBSEA ACTUATION SYSTEM WITH RETRIEVABLE POSITION INDICATOR

TECHNICAL FIELD

The present disclosure relates to a subsea actuation system with a retrievable position indicator. More particularly, the present disclosure relates to a subsea actuation system with a retrievable position indicator, that is at least partly retrievable, where the subsea actuation system is connectable to a subsea structure with a valve used in the oil and gas industry. The position indicator indicates the position of the valve.

BACKGROUND

A subsea actuation system is used for operating a valve on a valve assembly, such as a subsea Christmas (X-mas) tree. A retrievable actuator is used to connect to the subsea actuation system to operate the valve. The subsea actuation system has a position indicator indicating a position of the valve, for example, if the valve is open or closed. This position indicator may break or not function properly. It is desirable to be able to replace the position indicator.

A further problem is that such replacement takes place subsea, possibly at several thousand meters depth. This results in further problems such as high pressures, water current, darkness, presence of water, etc. The position indicator must also comply with regulations and standards in the oil and gas industry.

A further technical problem is that any part of the position indicator and its replacement must function without the possibility of failing, fulfill technical and legal requirements, and be easy to use. It is desirable that any solution is simple, not expensive to produce, and reliable. It is further a technical problem to avoid cumbersome arrangements that are expensive to manufacture or assemble.

SUMMARY

According to embodiments of the present disclosure, a subsea actuation system with a, at least partly, retrievable position indicator is disclosed herein. This can be achieved by the features as defined by the independent claims. Further enhancements are characterized by the dependent claims. The embodiments are further defined by the claims.

According to one embodiment, a subsea actuation system with a, at least partly, retrievable position indicator is disclosed. A part of the position indicator is at least retrievable. The subsea actuation system being connectable to a subsea structure with a valve with a rising valve stem. The rising valve stem comprises a rotation-to-linear mechanism for operating the valve. The subsea actuation system comprises an interface for receiving rotational input from a separate retrievable actuator. The interface comprises a cylindrical bucket comprising an opening in an axial direction of the cylindrical bucket, and a shaft for receiving the rotational input from the retrievable actuator, the shaft being connected to the rotation-to-linear mechanism. The position indicator is configured for indicating an amount of rotational movement of the shaft and hence a position of the valve, and at least a part of the position indicator is configured to be positionable at, and retrievable from, the interface. A first part of the position indicator is configured for being in an interior of the cylindrical bucket, and a second part of the position indicator is configured for being positionable at, and retrievable from, an outer side of the cylindrical bucket.

The first part being connected to the second part through an opening in the cylindrical bucket, the opening being a through opening in the radial direction. The through opening goes through a side of the cylindrical bucket, in the radial direction. Further enhancements are characterized by the dependent claims.

At least one of the above embodiments provides one or more solutions to the problems and disadvantages with the background art. Other technical advantages of the present disclosure will be readily apparent to one skilled in the art from the following description and claims. Various embodiments of the present application obtain only a subset of the advantages set forth. No one advantage is critical to the embodiments. Any claimed embodiment may be technically combined with any other claimed embodiment or embodiments.

BRIEF DESCRIPTION OF THE DRAWINGS

The accompanying drawings illustrate presently example embodiments of the disclosure and serve to explain, by way of example, the principles of the disclosure.

DETAILED DESCRIPTION

Figure 1:
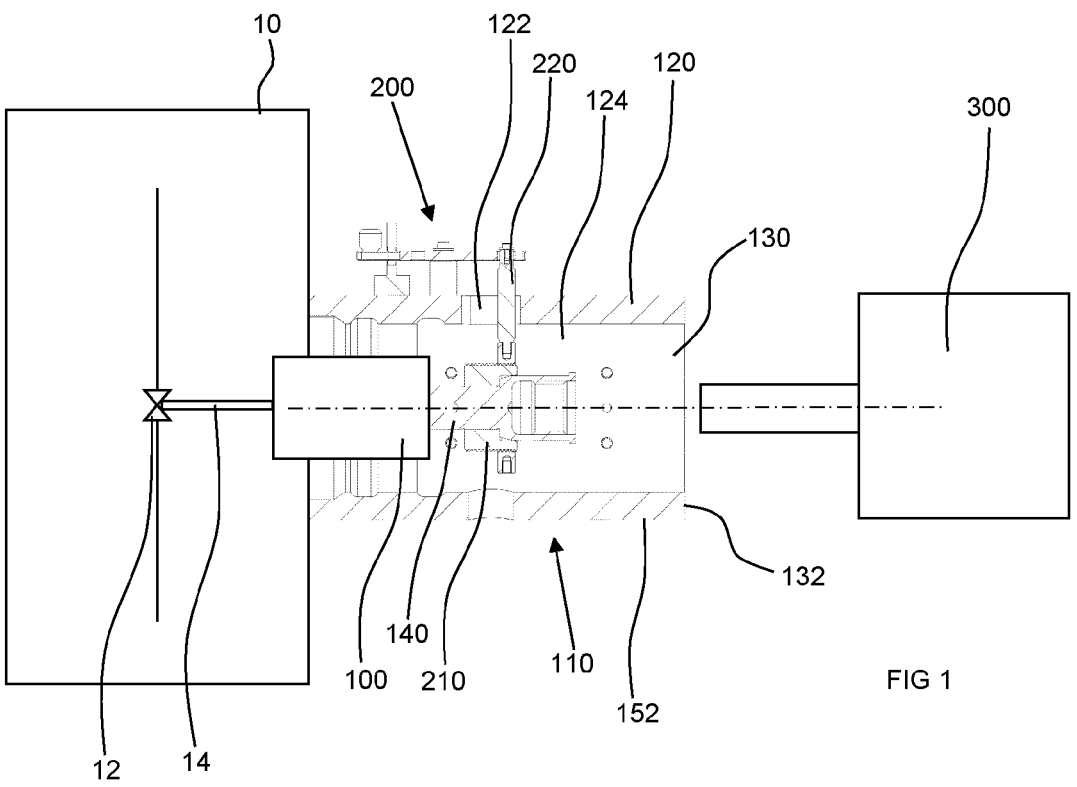
FIG. 1 is a diagrammatic illustration of a subsea actuation system according to an example embodiment of the disclosure.
Figure 2:
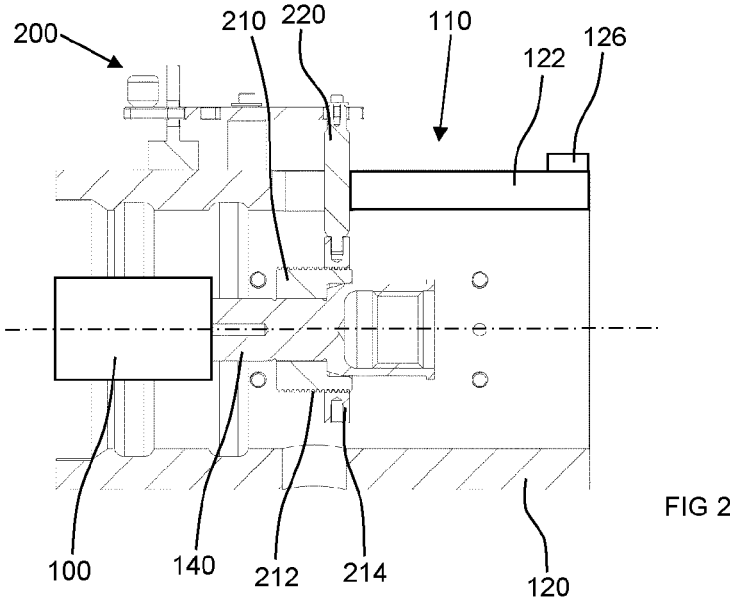
FIG. 2 is a diagrammatic illustration of a subsea actuation system according to an example embodiment of the disclosure.
Figure 3:
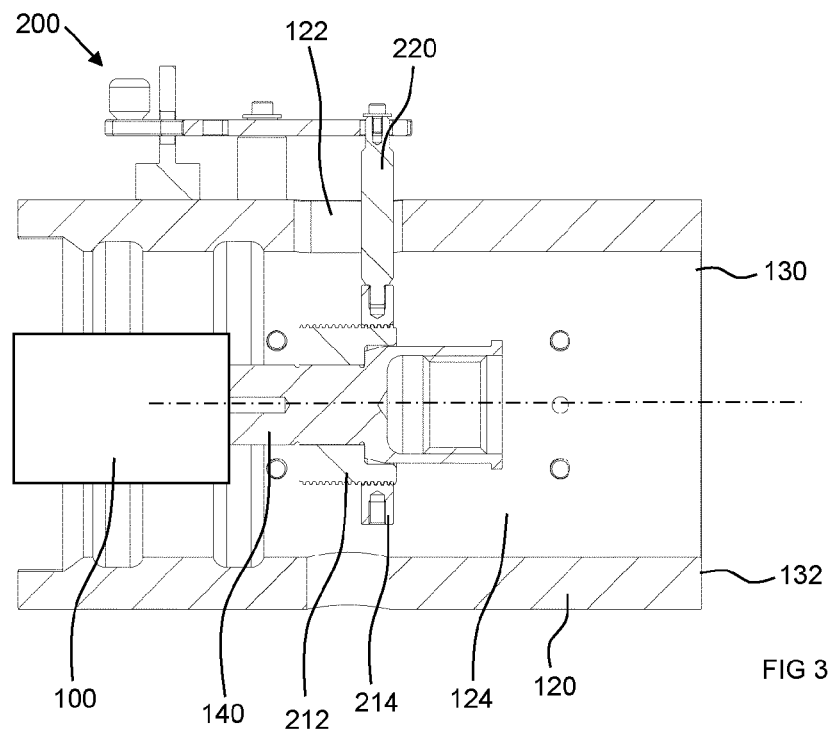
FIG. 3 is a diagrammatic illustration of a subsea actuation system according to an example embodiment of the disclosure.
Figure 4:
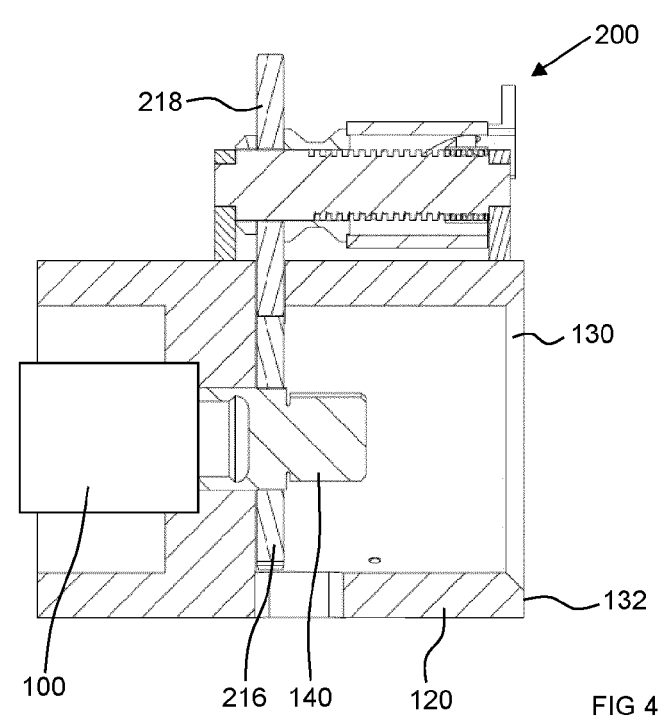
FIG. 4 is a diagrammatic illustration of a subsea actuation system according to an example embodiment of the disclosure.

FIGS. 1 to 4 illustrate example embodiments of the subsea actuation system. FIG. 1 illustrates an example embodiment of the subsea actuation system, while FIGS. 2 to 4 illustrate different example embodiments of the interface 110 and the position indicator 200.

With reference to FIG. 1, there is shown an example embodiment of a subsea actuation system with a, at least partly, retrievable position indicator 200. The subsea actuation system is connectable to a subsea structure 10 with a valve 12 with a rising valve stem 14. The rising valve stem 14 comprises a rotation-to-linear mechanism 100 for operating the valve 12. The subsea actuation system comprises an interface 110 for receiving rotational input from a separate retrievable actuator 300. In embodiments, the subsea structure 10 is an assembly of valves, such as, for example, a X-mas tree 10. In embodiments, the valve 12 is used to regulate the flow of fluid from an oil well and/or is used to control the flow of fluid emanating from the well or to introduce an additive to the flow of fluid. In embodiments, the valve 12 controls flow in manifolds and other subsea structures. In embodiments, the valve 12 is operated by the subsea actuation system. The interface 110 of the subsea actuation system is attachable to the subsea structure, for example, bolted onto the subsea structure.

The interface 110 comprises a cylindrical bucket 120 and a shaft 140. The cylindrical bucket 120 comprises an opening 130 in an axial direction of the cylindrical bucket 120. The shaft 140 is for receiving the rotational input from the retrievable actuator 300. The shaft 140 is connected to the rotation-to-linear mechanism 100. In embodiments, the opening 130 of the bucket 120 extends and open in the axial direction to an end 132 of the cylindrical bucket 120 facing away from the subsea structure 10.

The position indicator 200 is configured for indicating an amount of rotational movement of the shaft 140 and hence a position of the valve 12. Thus, the position indicated by the position indicator 200 is if the valve 12 is open or closed and how much the valve 12 is open. At least a part of the position indicator 200 is configured to be positionable at, and retrievable from, the interface 110. The part of the position indicator 200 that is outside the bucket 120 may be damaged and may be retrievable, while the part of the position indicator 200 that is inside the bucket 120 may not be damaged and needs not to be retrievable.

A first part 210 of the position indicator 200 is configured for being in an interior 124 of the cylindrical bucket 120, and a second part 220 of the position indicator 200 is configured for being positionable at, and retrievable from, an outer side 152 of the cylindrical bucket 120. The first part 210 is connected to the second part 220 through an opening 122 in the cylindrical bucket 120. The opening 122 being a through opening 122 in the radial direction. The opening 122 goes through the side wall of the bucket 120 so that the first part 210 connects to the second part 220. It may therefore be sufficient to retrieve and replace only the second part 220, the part of the position indicator 200 that is outside the bucket 120, instead of the whole position indicator 200.

According to one embodiment, the first part 210 of the position indicator 200 is configured for being positionable at, and retrievable from, an interior 124 of the cylindrical bucket 120. In embodiments, the first part 210 of the position indicator 200 is configured for being positionable at, and retrievable from, an outside of the bucket 120. In embodiments, the second part 220 of the position indicator 200 is configured for being positionable at, and retrievable from, an interior 124 of the cylindrical bucket 120. In embodiments, the second part 220 of the position indicator 200 is configured for being positionable at, and retrievable from, an outside of the bucket 120. In some embodiments, the second part 220 of the position indicator 200 is configured for being positionable at, and retrievable from, an outside of the bucket 120, while the first part 210 of the position indicator 200 remains inside the bucket 120. In embodiments, the first part 210 of the position indicator 200 is attached to the shaft 140 so that the first part 210 rotates with the shaft 140.

According to one embodiment, as illustrated in FIG. 2, the opening 122 extends in the axial direction of the cylindrical bucket 120. In embodiments, the opening 122 extends and opens up in the axial direction to an end 132 of the cylindrical bucket facing away from the subsea structure 10. In this way, the first part 210 of the position indicator 200 is retrieved by sliding it in the axial direction of the bucket 120. As illustrated in FIG. 1, the through opening 122 allows the first part 210 of the position indicator 200 to be retrieved by sliding it in the radial direction of the bucket 120.

As illustrated in FIG. 2, in embodiments, the opening 122 comprises a lock 126 at the end 132 of the bucket 120. In embodiments, the lock 126 closes the opening 122 at the end 132 of the cylindrical bucket 120. In embodiments, the lock 126 is, for example, a latch 126. In embodiments, the lock 126 holds the opening 122 closed and the lock 126 opens when the position indicator 200 is retrieved by sliding it in the axial direction of the bucket 120 along the opening 122.

According to one embodiment, the position indicator 220 is configured to be positionable at, and retrievable from, the interface 110 by the retrievable actuator 300. In embodiments, the position indicator 220 is configured to be attachable to the interface 110. In embodiments, the position indicator 220 is configured to be retrievable by the actuator 300. In embodiments, the actuator 300 has an arrangement, for example, a gripper, that can attach and remove the position indicator 220 to and from the interface 110.

As illustrated in the figures, the first part 210 and the second part 220 are configured to be connectable to each other through the opening 122. This allows the position indicator 220 to be positionable at, and retrievable from, the interface 110 by the retrievable actuator 300. In embodiments, the first part 210 and the second part 220 are connected by a screw connection, a snap connection or a quick connect coupling. In embodiments, the position indicator 220 and/or the interface 110 has a guiding arrangement for facilitating such connection.

As illustrated in the figures, the first part 210 of the position indicator 200 is arranged around the shaft 140. In embodiments, the first part 210 of the position indicator 200 is arranged around the shaft 140 by a screw connection, a snap connection or a quick connect coupling. In embodiments, the first part 210 of the position indicator 200 is permanently attached to the shaft 140 with no possibility to remove the first part 210 separately from the shaft 140.

As illustrated in the figures, the first part 210 of the position indicator 200 comprises a cog wheel. For example, the shaft 140, or the first part 210, comprises a threaded spindle 212. In embodiments, the shaft 140, or the first part 210, comprises a saddle nut 214 around the threaded spindle 212. In embodiments, the saddle nut 214 rides on the threaded spindle 212 and cause a displacement in the axial direction of the second part 220. In embodiments, the second part 220 of the position indicator is detachably connected to the saddle nut 214. In embodiments, the opening 122 is elongate to allow such axial displacement, and this displacement indicates the position of the valve 12, such as, for example, an open or closed position. In an alternate embodiment, such axial displacement is transferred into another displacement that is easily detectable from a remote operated vehicle operating the separate retrievable actuator 300. Such another displacement is a linear movement or a rotating movement of an indicator perpendicular to the axis of the bucket 120, as illustrated in the figures.

As illustrated in FIG. 4, the first part 210 comprises a first spur gear 216 and the second part 220 comprises a second spur gear 218. In embodiments, the second spur gear 218 indicates the position of the valve 12 directly, or via a saddle nut riding on a threaded spindle, similar to what has been described above. In embodiments, the first spur gear 216 is directly attached to the shaft 140.

According to one embodiment and as illustrated by the figures, the shaft 140 and the cylindrical bucket 120 are concentric. In embodiments, the shaft 140 extends through the closed bottom of the bucket 120. The shaft 140 is accessible to the separate retrievable actuator 300 through the opening 130 of the bucket 120.

According to one embodiment and as illustrated by the figures, the bucket 120 is, substantially, a right circular hollow cylinder, for example, a cylindrical shell, and the rotation-to-linear mechanism 100 forms a bottom 124 of the bucket 120 through which the shaft 140 protrudes. Such an arrangement forms the interface 110 that can receive rotational input from the separate retrievable actuator 300 and at the same time the position indicator 200 can be retrieved by the retrievable actuator 300.

According to one embodiment and as illustrated by the figures, the actuation system is a valve actuation system, with a rising valve stem, configured to open and close the valve 12. In embodiments, the valve 12 is a master valve, or a wing valve, of the subsea structure 10. In embodiments, the subsea structure 10 is a subsea X-mas tree.

According to one embodiment, the rotation-to-linear mechanism 100 and the interface 110 are bolted to the subsea structure 10. In embodiments, the rotation-to-linear mechanism 100 and the interface 110 are only retrievable with the subsea structure 10, such as the subsea X-mas tree.

According to one embodiment, the retrievable actuator 300 is operated by electric power. In embodiments, the retrievable actuator 300 is operated by a ROV and comprises batteries and an electric rotational motor. In embodiments, the retrievable actuator 300 is connectable to the rising valve stem 14.

This written description uses examples to disclose the various embodiments described herein and also to enable any person skilled in the art to practice the various embodiments, including making and using the adapters and performing the methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A subsea actuation system configured to couple to a subsea structure with a valve with a rising valve stem, the rising valve stem including a rotation-to-linear mechanism for operating the valve, the subsea actuation system comprising:

an interface for receiving rotation input from a separate retrievable actuator, the interface including:

a cylindrical bucket defining a first opening in an axial direction of the cylindrical bucket, the cylindrical bucket defining an interior and a second opening, the second opening being a through opening in a radial direction with respect to the axial direction, and a shaft located within the interior, the shaft for receiving the rotational input from the retrievable actuator, the shaft coupled to the rotation-to-linear mechanism; and a position indicator, at least a part of the position indicator configured to be positionable at the interface, at least the part of the position indicator configured to be retrievable from the interface, the position indicator configured to indicate an amount of rotational movement of the shaft and thereby a position of the valve, the position indicator including:

a first part configured for being positionable within the interior of the cylindrical bucket, and a second part coupled to the first part through the second opening, the second part configured for being positionable on an outer side of the cylindrical bucket, the second part being retrievable from the outer side of the cylindrical bucket.

2. The subsea actuation system of claim 1, wherein the first part of the position indicator is configured for being located at, and retrievable from, the interior of the cylindrical bucket.

3. The subsea actuation system of claim 1, wherein the second opening extends in the axial direction, the second opening extends and opens in the axial direction to an end of the cylindrical bucket facing away from the subsea structure.

4. The subsea actuation system of claim 3, wherein the second opening further comprises a lock at the end to close the second opening at the end of the cylindrical bucket.

5. The subsea actuation system of claim 1, wherein the position indicator is configured to be positionable at, and retrievable from, the interface by the retrievable actuator.

6. The subsea actuation system of claim 1, wherein the first part of the position indicator is arranged around the shaft.

7. The subsea actuation system of claim 1, wherein the first part of the position indicator further comprises a cog wheel.

8. The subsea actuation system of claim 1, wherein the shaft or the first part comprises a threaded spindle.

9. The subsea actuation system of claim 8, wherein the shaft or the first part further comprises a saddle nut around the threaded spindle.

10. The subsea actuation system of claim 1, wherein the shaft and the bucket are concentric.

11. The subsea actuation system of claim 1, wherein the bucket is substantially a right circular hollow cylinder and the rotation-to-linear mechanism forms a bottom of the bucket through which the shaft protrudes.

12. The subsea actuation system of claim 1, wherein the actuation system is a valve actuation system configured to open and close the valve, the valve being a master valve or a wing valve of the subsea structure.

13. The subsea actuation system of claim 1, wherein the rotation-to-linear mechanism and the interface are bolted to the subsea structure.

14. The subsea actuation system of claim 1, wherein the retrievable actuator is operated by electric power.

15. A subsea actuation system configured to couple to a subsea structure with a valve with a rising valve stem, the subsea actuation system comprising:

a tube defining a first opening in an axial direction of the tube, the tube defining an interior and a second opening, the second opening being a through opening in a radial direction with respect to the axial direction;

a shaft located within the interior, the shaft for receiving rotational input from a separate retrievable actuator, the shaft coupled to the rising valve stem; and a position indicator coupled to the shaft, the position indicator configured to indicate an amount of rotational movement of the shaft and thereby a position of the valve, the position indicator including:

a first part configured for being positionable within the interior of the tube, and a second part coupled to the first part through the second opening, the second part configured for being positionable on an outer side of the tube, the second part being retrievable from the outer side of the tube.

16. The subsea actuation system of claim 15, wherein the first part of the position indicator is configured for being located at, and retrievable from, the interior of the tube.

17. The subsea actuation system of claim 15, wherein the second opening extends in the axial direction, the second opening extends and opens in the axial direction to an end of the tube facing away from the subsea structure.

18. The subsea actuation system of claim 17, wherein the second opening further comprises a lock at the end to close the second opening at the end of the tube.

19. The subsea actuation system of claim 15, wherein the position indicator is configured to be positionable at, and retrievable from, the tube by the retrievable actuator.

20. The subsea actuation system of claim 15, wherein the first part of the position indicator is arranged around the shaft.

\* \* \* \* \*